United States Patent
McKinley

(10) Patent No.: US 9,692,587 B2
(45) Date of Patent: Jun. 27, 2017

(54) PHASE TRACKING

(71) Applicant: Higher Ground LLC, Palo Alto, CA (US)

(72) Inventor: Bruce L. McKinley, South Riding, VA (US)

(73) Assignee: Higher Ground LLC, Palo Alto, CA (US)

( * ) Notice: Subject to any disclaimer, the term of this patent is extended or adjusted under 35 U.S.C. 154(b) by 116 days.

(21) Appl. No.: 14/922,345

(22) Filed: Oct. 26, 2015

(65) Prior Publication Data

US 2017/0118004 A1    Apr. 27, 2017

(51) Int. Cl.
*H04L 7/00* (2006.01)
*H04L 27/26* (2006.01)

(52) U.S. Cl.
CPC ............ *H04L 7/002* (2013.01); *H04L 7/0079* (2013.01); *H04L 27/2605* (2013.01); *H04L 27/2613* (2013.01)

(58) Field of Classification Search
CPC ............. H04L 27/2675; H04L 27/2659; H04L 27/266; H04L 2027/0026; H04L 27/2676; H04L 7/002; H04L 27/2613; H04L 27/2605; H04L 7/0079; H04B 17/21; H04B 10/611
USPC ......... 375/260, 326, 355, 324, 329; 329/304
See application file for complete search history.

(56) References Cited

U.S. PATENT DOCUMENTS

| | | | |
|---|---|---|---|
| 6,567,480 B1 | 5/2003 | Brardjanian et al. | |
| 7,068,593 B2* | 6/2006 | Cho | H04L 25/0204 370/208 |
| 2003/0058951 A1* | 3/2003 | Thomson | H04L 27/2675 375/260 |
| 2007/0036065 A1 | 2/2007 | Wang | |
| 2007/0140212 A1 | 6/2007 | Gaikwad et al. | |
| 2008/0056305 A1 | 3/2008 | Medvedev et al. | |
| 2008/0089458 A1 | 4/2008 | Wallace et al. | |
| 2011/0090995 A1 | 4/2011 | Wilhelmsson et al. | |
| 2012/0027147 A1* | 2/2012 | Ray | H04L 27/2647 375/359 |

OTHER PUBLICATIONS

Int'l Search Report and Written Opinion issued Jan. 19, 2017 in Int'l Application No. PCT/US2016/057937.

* cited by examiner

*Primary Examiner* — Rahel Guarino
(74) *Attorney, Agent, or Firm* — Panitch Schwarze Belisario & Nadel LLP

(57) ABSTRACT

Techniques for pilot-aided carrier frequency and phase synchronization may use a three-pass process. In a first pass, initial frequency offset may be addressed, and a frame start time may be established. In a second pass, a fine frequency correction may be performed. In a third pass, phase variation may be tracked and corrected using a minimum set of pilot symbols.

33 Claims, 5 Drawing Sheets

PHASE TRACKING

FIELD OF ENDEAVOR

Aspects of the present disclosure may relate to techniques for carrier phase acquisition and tracking in communication systems.

BACKGROUND

Carrier phase acquisition and tracking are common issues in communication systems. In acquisition, an initial carrier phase synchronization may be performed at a receive-end of the communication system. However, varying channel conditions, phase noise, oscillator mismatch and drifts (at transmitter and/or receiver), etc., can cause the carrier phase to vary throughout a reception, and it is often beneficial to continue to adjust the phase at the receiver (termed "phase tracking"). This may be done, e.g., on a continuous basis, on a periodic basis, or on an as-needed basis (e.g., a process may be triggered when some criterion is satisfied (e.g., error rate or some quality measure falls below a predetermined level)).

Phase tracking (and/or acquisition) may be particularly difficult in weak-signal environments, e.g., where the received signal is below a "noise floor" in the band in which it is received (i.e., has a "negative signal-to-noise ratio (SNR)," in decibels). This may be done deliberately, e.g., using direct-sequence spread-spectrum (DSSS) or other spectral spreading techniques, for example, to avoid interfering with other signals transmitted in the same band, to allow multiple access in the same band, and/or to decrease detectability of the signaling by unintended receivers. It may also occur unintentionally, e.g., due to signal attenuation, intentional or unintentional electromagnetic interference from other sources, etc. One example is the transmission of DSSS signals over satellite links, where the DSSS signals have their energy purposely spread over a wide band (wider, at least, than a bandwidth that would normally be needed to transmit the signals, were they not spread), and where the satellite link may introduce significant attenuation, e.g., where the satellite used is in geosynchronous orbit.

Synchronization in phase (and often frequency, as well) may be further complicated by the fact that baseband symbol instants are often unknown at the receiver, or may be approximated/extrapolated. In some cases, extrapolation may cause the receiver to extract "timing instants" that occur before the signal has actually arrived at the receiver, and which thus do not actually contain any signal energy. At negative SNRs, if timing instants with no signal energy are used in frequency/phase estimation, they may cause a failure in packet sync correlation. For more traditional approaches (in which extrapolation is not used), the same basic effect may occur when samples without any signal content are fed into a synchronization loop.

These effects are unavoidable unless the exact packet start instant is known. However, the start instant cannot be known at very low SNR without estimating frequency well enough to cause a correlation to succeed (or running a bank of frequency-adjusted correlators, which may be computationally prohibitive).

Typical methods of frequency/phase synchronization may use a phase detector and a phase-locked loop (PLL) connected to some sort of adjustable mixing device. The phase detector may be data-driven, such as using a unique word (UW) sync pattern, or data-independent, such as "power-of-2" estimation. However, such synchronization may be difficult when the symbol energy to noise power spectral density (referred to with the symbol $E_s/N_0$) is less than unity, or negative in terms of decibel units. In such cases a PLL cannot be used because the loop SNR will be too low to maintain lock. In fact, in such cases it is often difficult to even detect that a signal is present.

Pilot-aided acquisition strategies (i.e., using pilot tones or symbols) are often used in cases of low SNR in order to provide estimation benefits from known sources of frequency or phase information. However, using pilot information may result in a cost, in terms of data transmission efficiency (in power, bandwidth, time, duty cycle, etc.). For that reason, it may be beneficial to limit the use of pilot information as much as possible.

SUMMARY OF THE DISCLOSURE

Various aspects of the disclosure may be directed to a three-stage pilot-aided frequency and phase synchronization process that may adjust frequency offset to establish a packet start time; may finely adjust frequency offset once the packet start time is determined; and may track phase variation using a minimal set of received pilot symbols.

Various operations may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

BRIEF DESCRIPTION OF ACCOMPANYING DRAWINGS

Various aspects of this disclosure will now be discussed in further detail in conjunction with the attached drawings, in which.

DETAILED DESCRIPTION OF ASPECTS OF THE DISCLOSURE

Figure 1:
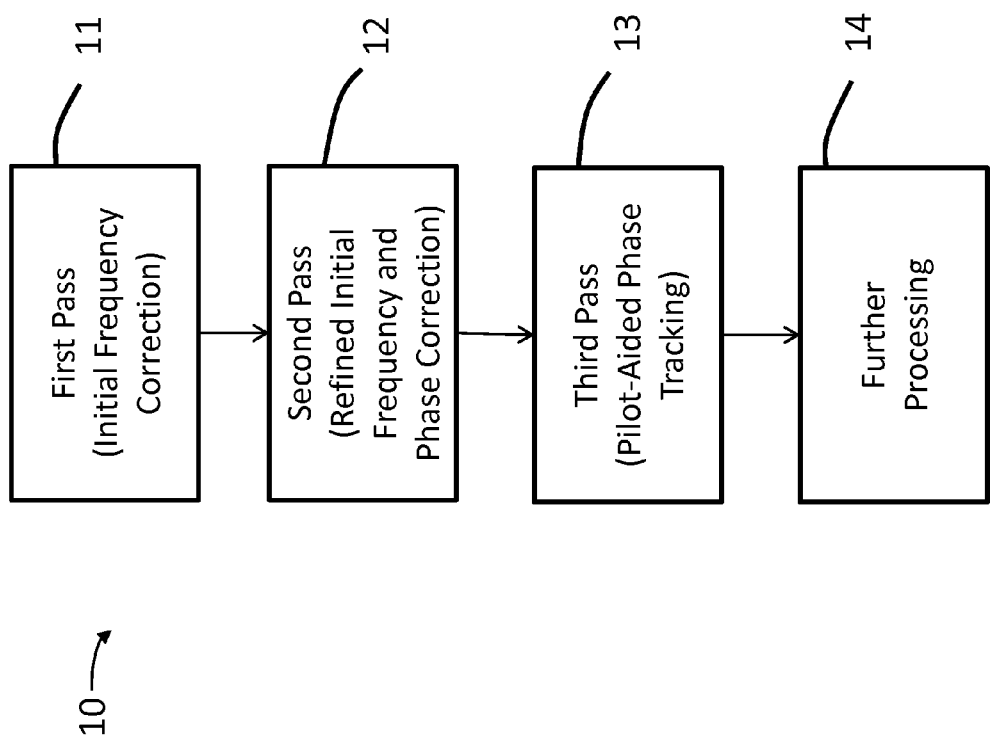
FIG. 1 shows a conceptual flow diagram of an example according to an aspect of this disclosure.

FIG. 1 shows a conceptual flow diagram of an example according to various aspects of this disclosure. A signal may be received, and candidate symbol sample instants may be obtained from the received signal (not shown); this may be done according to any method. However, symbol timing/clock phase may still not be certain, e.g., because the start time of a packet containing a set of symbols may not be precisely determined by finding the candidate symbol sample instants (and/or for other reasons, such as clock drift, etc.), and this may lead to erroneous reception. The example of FIG. 1 may be used to more precisely determine and correct carrier frequency and track phase variations throughout the reception. According to the example of FIG. 1, a process 10 may include a first pass 11, which may perform initial frequency correction based on the candidate symbol sample instants, a second pass 12, which may perform refined initial frequency correction and phase correction, and a third pass 13, which may perform pilot-aided phase tracking. The corrected symbol sample instants may then be subject to further processing 14, such as, but not limited to, demodulation and decoding. Details of examples of the three-pass correction 11, 12, 13 are described further below.

Figure 2:
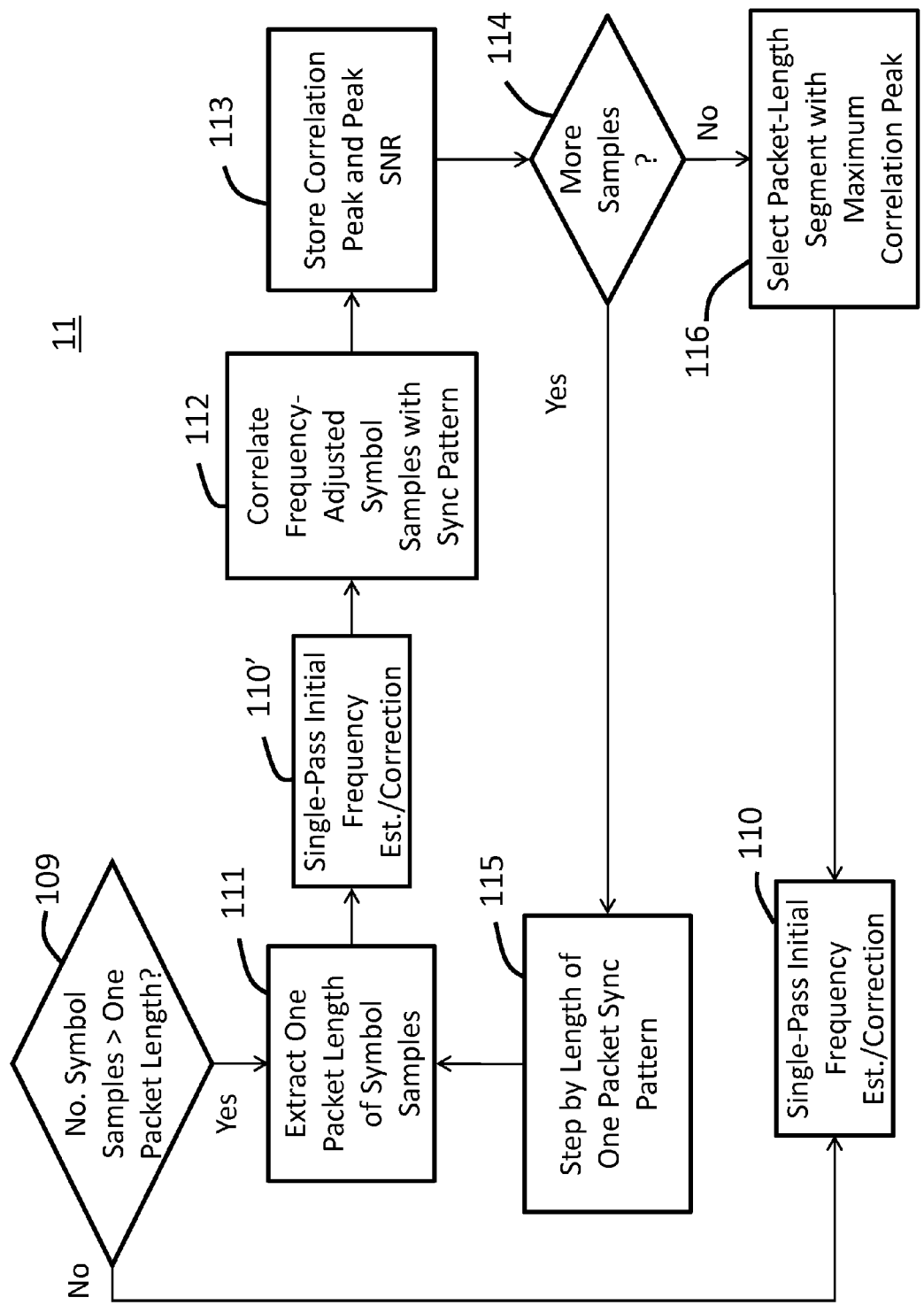
FIG. 2 shows a conceptual flow diagram of a portion of the example of FIG. 1, according to various aspects of the disclosure.

FIG. 2 shows an example of first pass 11, according to an aspect of this disclosure. The single-pass frequency estimation 110 or 110' may be performed using any method of non-data-dependent estimation of frequency offset. For example, a "power-of-two" technique may be used for binary-PSK (BPSK), or a "power-of-four" technique may be used for quaternary-PSK (QPSK), and so on. Signaling is not limited to PSK-type signaling, and the frequency estimation technique is not limited to the techniques discussed above. The operation of first pass 11 may depend 109 on a number of candidate symbol samples input. If the number of candidate symbol samples corresponds to a single packet-length's worth of samples, a single pass 110 may be used to perform the initial estimation and to perform frequency correction. However, more generally, there will be more than a single packet-length's worth of samples, and stepping through groups of potential packet-lengths of samples may help ensure that erroneous frequency estimates are not computed, and this may be an iterative process, depending on how many candidate symbol samples are present.

In particular, such a process may begin by extracting from the received candidate symbol samples one packet-length of samples 111, and a non-data-dependent initial frequency offset estimation technique 110', as discussed above (and which may operate the same as block 110), may be applied to the packet-length of samples. This may be used to frequency-adjust the samples, and the frequency-adjusted samples may be correlated 112 with a known packet synchronization pattern (S) that may be embedded in the symbols. The location of the peak and the SNR at the peak may be stored 113 for later reference. If there are more symbol samples 114, the process may step by a number of symbols equal to the length of the packet synchronization pattern 115, and a next packet length of samples may be selected 111. This process may continue similarly until it is determined 114 that there are no further candidate symbol samples to be examined. At this point, the process may determine the location of the maximum correlation peak 116, which may be selected based on the stored location and SNR information. Frequency correction 110 may then be performed based on a frequency offset estimate corresponding to the set of samples that resulted in the selected maximum correlation peak. The result of first pass 11 may thus be a set of samples that delineates a packet with initial fixed frequency offset corrected, and may thus establish a packet start time.

In some cases, a packet start time may be selected for which there are not sufficient symbol samples to comprise a full packet. In this case, additional symbol instants may be extrapolated, through any acceptable means of specifying symbol timing instants, and their respective symbol values may be added to the end of the packet.

Figure 3:
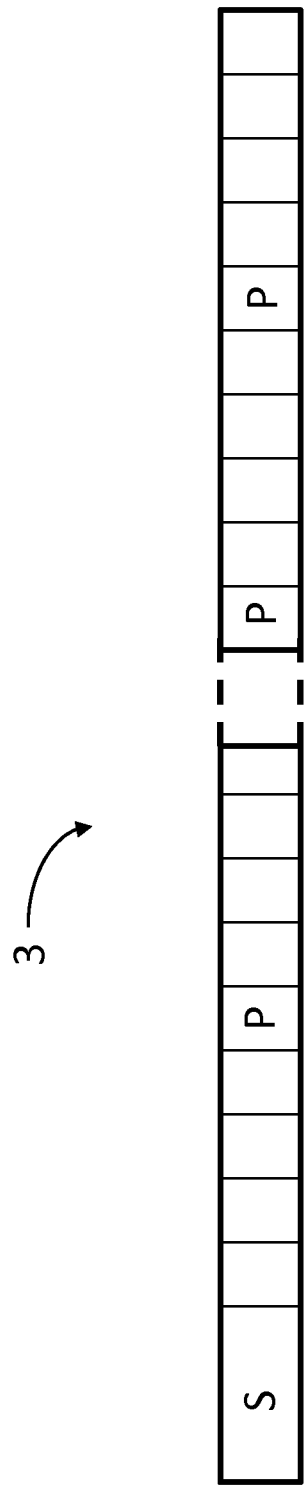
FIG. 3 shows a conceptual example of a packet, according to an aspect of the disclosure.

As noted above, and as shown in the example of FIG. 3, a packet 3 may contain an embedded synchronization ("pilot") pattern, where the synchronization symbols (or "pilot symbols") of the sync pattern are denoted "P" in FIG. 3. Also, as noted above, a packet synchronization pattern may establish the starting point of a packet, and is represented by "S" in FIG. 3. The synchronization pattern S may be obtained from a pseudorandom sequence. The synchronization symbols P may also be obtained from a pseudorandom sequence, and they may be evenly distributed throughout packet 3. The unmarked symbols in the packet 3 may represent data or other symbols. In general, it may be advantageous to limit the number of synchronization symbols P per packet to only a number necessary for a given channel, in order to maximize information throughput. The number of synchronization symbols may be predetermined and may be based, for example, on experimentation and/or other empirical data (e.g., measurements of channel conditions).

Figure 4:
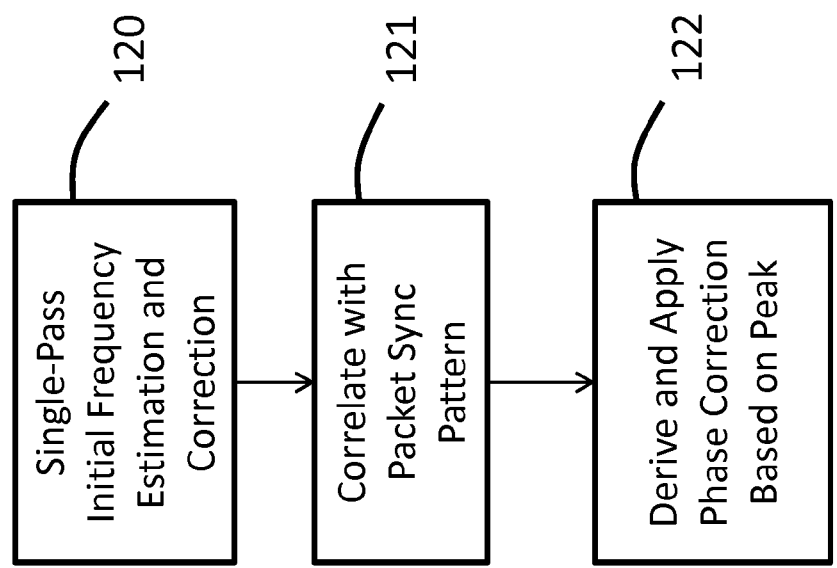
FIG. 4 shows a conceptual flow diagram of a portion of the example of FIG. 1, according to various aspects of the disclosure.

FIG. 4 shows an example of second pass 12, according to an aspect of this disclosure. This may begin by taking the symbol samples selected in first pass 11 and re-performing single-pass frequency estimation and correction 120, which may be done in the same way as or using a different technique from that used in block 110 of FIG. 2. This may serve to further correct the frequency offset of the selected symbol samples. The further-corrected symbol samples may then be correlated with the synch pattern 121, which may serve to confirm the start instant of the packet. An initial carrier phase correction may be derived 122 from the angle of the complex correlation result corresponding to the peak selected in block 116 of FIG. 2. In particular, the initial phase correction may be taken to be the negative of the phase of the peak value output from the correlation 121. This initial phase correction may be applied 122 to all of the symbol samples in the packet.

Figure 5:
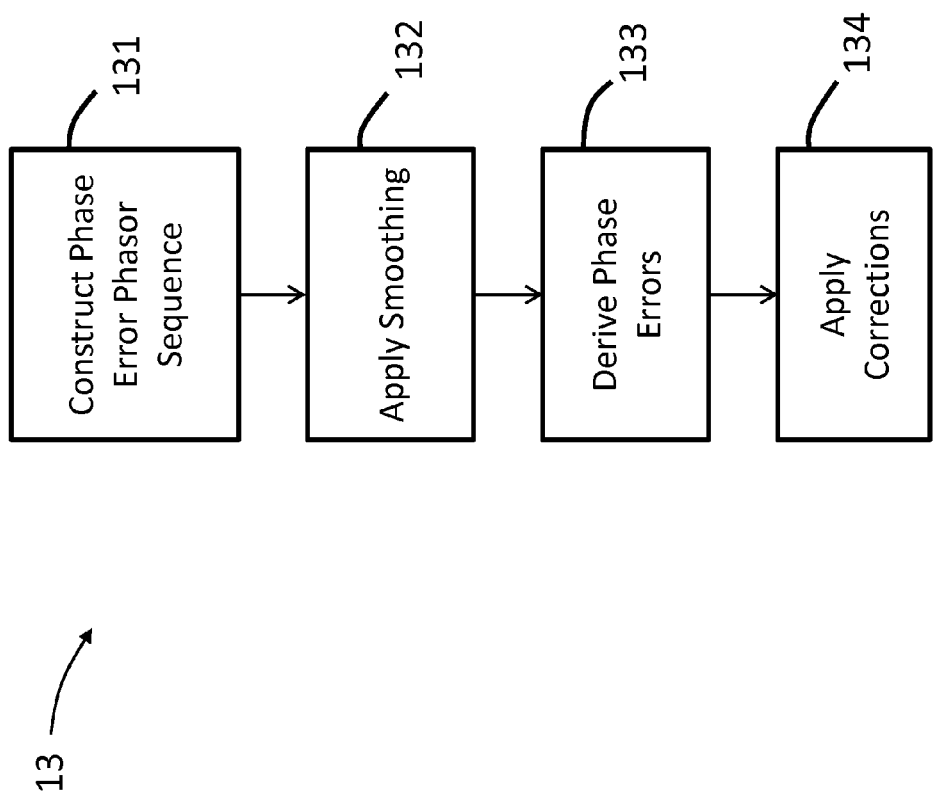
FIG. 5 shows a conceptual flow diagram of a portion of the example of FIG. 1, according to various aspects of the disclosure.

FIG. 5 shows an example of third pass 13, according to an aspect of this disclosure. The third pass represents the phase tracking/correction operation that may be required as the results of phase variations in the reception due to phase noise, oscillator mismatch, channel variations, etc. The third pass may begin by constructing a phase error phasor sequence 131 based on the corrected symbol samples obtained in the second pass 12. This may be done by multiplying a subset of the corrected symbol samples corresponding to known values, which may correspond to the pilot symbols, e.g., as in FIG. 3, by complex conjugate phasors corresponding to their respective known values.

Next, the resulting error phasors may be integrated/smoothed 132 by applying a moving average or some other low-pass filtering method. The amount of smoothing may be selected based, e.g., on the expected phase fluctuation rate due to phase noise, short-term frequency drift, and/or Doppler rate.

The smoothed error phasors may then be used to derive phase errors 133. This may be done by finding the angle at each smoothed error phasor location and then interpolating to derive phase errors for the symbol samples for which error phasors were not obtained (e.g., information symbols). Phase corrections may then be applied to the symbol samples 134 by using the complex conjugates of the respective phase errors (e.g., by multiplying by unit phasors (complex exponentials) having angles with values that are negatives of the determined angles (i.e., unit phasors that are complex conjugate of unit error phasors; however, the invention is not thus limited, and other techniques for introducing phase shifting may be used).

Following phase tracking/correction, further processing 14, such as, but not limited to, symbol detection, error-control decoding, etc., may be performed.

Various operations described above may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of phase tracking in a communication system, the method including:
    performing, at a receiving apparatus of the communication system, an initial frequency correction based on received symbol samples, to output first corrected samples, wherein the initial frequency correction comprises performing at least one non-data-dependent frequency estimation and correction on a single packet-length's worth of the received symbol samples, wherein a number of the received symbol samples is greater than one packet length's worth of symbol samples, wherein the initial frequency correction further comprises iteratively stepping through packet-length sets of the received symbol samples to obtain the single packet-length's worth of received symbol samples, and wherein the iteratively stepping through packet-length sets of the received symbol samples comprises:
        extracting a symbol block containing one packet-length's worth of received symbol samples;
        performing non-data-dependent frequency estimation and correction on the symbol block to obtain frequency-adjusted symbol samples;
        correlating the frequency-adjusted symbol samples with a packet sync pattern; and
        identifying the packet start sample by the correlation value with maximum magnitude;
    performing, at the receiving apparatus, a second frequency correction and initial phase correction on the first corrected samples to output second corrected samples; and
    performing, at the receiving apparatus, pilot symbol-aided phase tracking/correction to the second corrected samples.

2. The method of claim 1, wherein the iteratively stepping through packet-length sets of the received symbol samples further comprises:
    storing at least one result derived from the correlating;
    determining if there are further symbol samples available;
    if further symbol samples are available, stepping by a length of one packet sync pattern to extract a further symbol block, performing the non-data-dependent frequency estimation, packet sync pattern correlation, identification of symbol timing instant with maximum correlation magnitude, and storing at least one set of these results; and
    if no further symbol samples are available, selecting a symbol block, based on the at least one result, and performing the non-data-dependent frequency estimation and correction on the selected symbol block.

3. The method of claim 2, wherein the at least one result comprises a correlation peak sample instant and a peak signal-to-noise ratio, and wherein selecting a symbol block comprises selecting a symbol block corresponding to a maximum correlation peak.

4. A method of phase tracking in a communication system, the method including:
    performing, at a receiving apparatus of the communication system, an initial frequency correction based on received symbol samples, to output first corrected samples;
    performing, at the receiving apparatus, a second frequency correction and initial phase correction on the first corrected samples to output second corrected samples; and
    performing, at the receiving apparatus, pilot symbol-aided phase tracking/correction to the second corrected samples,
    wherein performing the second frequency correction and initial phase correction comprises:
        performing non-data-dependent frequency estimation and correction on the first corrected samples, to obtain a block of further corrected samples;
        correlating the further corrected samples with a packet sync pattern;
        using a peak correlation value to derive a packet timing instant and phase correction; and
        applying the phase correction to a packet length of further corrected symbol samples beginning with the selected packet timing instant.

5. The method of claim 4, wherein the initial frequency correction comprises performing at least one non-data-dependent frequency estimation and correction on a single packet-length's worth of the received symbol samples.

6. The method of claim 5, wherein a number of the received symbol samples is greater than one packet length's worth of symbol samples, and wherein the initial frequency correction further comprises iteratively stepping through packet-length sets of the received symbol samples to obtain the single packet-length's worth of received symbol samples.

7. The method of claim 6, wherein the iteratively stepping through packet-length sets of the received symbol samples comprises:
    extracting a symbol block containing one packet-length's worth of received symbol samples;
    performing non-data-dependent frequency estimation and correction on the symbol block to obtain frequency-adjusted symbol samples;
    correlating the frequency-adjusted symbol samples with a packet sync pattern; and
    identifying the packet start sample by the correlation value with maximum magnitude.

8. The method of claim 4, wherein the phase correction corresponds to a negative value of a phase of the peak correlation value.

9. A method of phase tracking in a communication system, the method including:
    performing, at a receiving apparatus of the communication system, an initial frequency correction based on received symbol samples, to output first corrected samples;
    performing, at the receiving apparatus, a second frequency correction and initial phase correction on the first corrected samples to output second corrected samples; and
    performing, at the receiving apparatus, pilot symbol-aided phase tracking/correction to the second corrected samples, wherein the pilot symbol-aided phase tracking/correction comprises:
constructing an error phasor sequence based on the second corrected samples;
applying smoothing to the error phasor sequence to obtain a smoothed error phasor sequence;
deriving one or more phase errors from the smoothed error phasor sequence; and
correcting the second corrected samples based on the one or more phase errors.

10. The method of claim 9, wherein the constructing the error phasor sequence comprises multiplying a subset of the second corrected samples corresponding to known values by complex conjugate phasors corresponding to those known values.

11. The method of claim 10, wherein the known values are pilot symbols.

12. The method of claim 11, wherein the pilot symbols are evenly spaced throughout a packet corresponding to the second corrected samples.

13. The method of claim 11, wherein values of the pilot symbols are selected based on a pseudorandom sequence.

14. The method of claim 9, wherein the applying smoothing comprises applying a low-pass filtering technique, and wherein an amount of smoothing is determined based on at least one item selected from the group consisting of: expected phase fluctuation rate due to phase noise; short-term frequency drift; and Doppler rate.

15. The method of claim 9, wherein the deriving one or more phase errors comprises:
finding an angle corresponding to a respective smoothed error phasor location; and
interpolating between angles to obtain angles corresponding to second corrected samples for which error phasors were not obtained.

16. The method of claim 15, wherein correcting the second corrected samples comprises applying complex phasors with negative values of the respective angles to the corresponding second corrected samples.

17. A storage device containing executable instructions for implementing operations for phase tracking in a communication system, the operations including:
performing an initial frequency correction based on received symbol samples, to output first corrected samples, wherein the initial frequency correction comprises performing at least one non-data-dependent frequency estimation and correction on a single packet-length's worth of the received symbol samples, wherein a number of the received symbol samples is greater than one packet length's worth of symbol samples, wherein the initial frequency correction further comprises iteratively stepping through packet-length sets of the received symbol samples to obtain the single packet-length's worth of received symbol samples, and wherein the iteratively stepping through packet-length sets of the received symbol samples comprises:
extracting a symbol block containing one packet-length's worth of received symbol samples;
performing non-data-dependent frequency estimation and correction on the symbol block to obtain frequency-adjusted symbol samples; and
correlating the frequency-adjusted symbol samples with a packet sync pattern; and
identifying the packet start sample by the correlation value with maximum magnitude;
performing a second frequency correction and initial phase correction on the first corrected samples to output second corrected samples; and
performing pilot symbol-aided phase tracking/correction to the second corrected samples.

18. The storage device of claim 17, wherein the iteratively stepping through packet-length sets of the received symbol samples further comprises:
storing at least one result derived from the correlating;
determining if there are further symbol samples available;
if further symbol samples are available, stepping by a length of one packet sync pattern to extract a further symbol block, performing the non-data-dependent frequency estimation, packet sync pattern correlation, identification of symbol timing instant with maximum correlation magnitude, and storing at least one set of these results; and
if no further symbol samples are available, selecting a symbol block, based on the at least one result, and performing the non-data-dependent frequency estimation and correction on the selected symbol block.

19. The storage device of claim 18, wherein the at least one result comprises a correlation peak sample instant and a peak signal-to-noise ratio, and wherein selecting a symbol block comprises selecting a symbol block corresponding to a maximum correlation peak.

20. A communication apparatus including:
at least one processor; and
the storage device of claim 17, wherein the storage device is communicatively coupled to the at least one processor, and wherein the at least one processor is configured to execute the executable instructions.

21. A storage device containing executable instructions for implementing operations for phase tracking in a communication system, the operations including:
performing an initial frequency correction based on received symbol samples, to output first corrected samples;
performing a second frequency correction and initial phase correction on the first corrected samples to output second corrected samples; and
performing pilot symbol-aided phase tracking/correction to the second corrected samples,
wherein performing the second frequency correction and initial phase correction comprises:
performing non-data-dependent frequency estimation and correction on the first corrected samples, to obtain a block of further corrected samples;
correlating the further corrected samples with a packet sync pattern;
using a peak correlation value to derive a packet timing instant and phase correction; and
applying the phase correction a packet length of further corrected symbol samples beginning with the selected packet timing instant.

22. The storage device of claim 21, wherein the initial frequency correction comprises performing at least one non-data-dependent frequency estimation and correction on a single packet-length's worth of the received symbol samples.

23. The storage device of claim 22, wherein a number of the received symbol samples is greater than one packet length's worth of symbol samples, and wherein the initial frequency correction further comprises iteratively stepping through packet-length sets of the received symbol samples to obtain the single packet-length's worth of received symbol samples.

24. The storage device of claim 23, wherein the iteratively stepping through packet-length sets of the received symbol samples comprises:
- extracting a symbol block containing one packet-length's worth of received symbol samples;
- performing non-data-dependent frequency estimation and correction on the symbol block to obtain frequency-adjusted symbol samples; and
- correlating the frequency-adjusted symbol samples with a packet sync pattern; and
- identifying the packet start sample by the correlation value with maximum magnitude.

25. The storage device of claim 21, wherein the phase correction corresponds to a negative value of a phase of the peak correlation value.

26. A storage device containing executable instructions for implementing operations for phase tracking in a communication system, the operations including:
- performing an initial frequency correction based on received symbol samples, to output first corrected samples;
- performing a second frequency correction and initial phase correction on the first corrected samples to output second corrected samples; and
- performing pilot symbol-aided phase tracking/correction to the second corrected samples,
- wherein the pilot symbol-aided phase tracking/correction comprises:
- constructing an error phasor sequence based on the second corrected samples;
- applying smoothing to the error phasor sequence to obtain a smoothed error phasor sequence;
- deriving one or more phase errors from the smoothed error phasor sequence; and
- correcting the second corrected samples based on the one or more phase errors.

27. The storage device of claim 26, wherein the constructing the error phasor sequence comprises multiplying a subset of the second corrected samples corresponding to known values by complex conjugate phasors corresponding to those known values.

28. The storage device of claim 27, wherein the known values are pilot symbols.

29. The storage device of claim 28, wherein the pilot symbols are evenly spaced throughout a packet corresponding to the second corrected samples.

30. The storage device of claim 28, wherein values of the pilot symbols are selected based on a pseudorandom sequence.

31. The storage device of claim 26, wherein the applying smoothing comprises applying a low-pass filtering technique, and wherein an amount of smoothing is determined based on at least one item selected from the group consisting of: expected phase fluctuation rate due to phase noise; short-term frequency drift; and Doppler rate.

32. The storage device of claim 26, wherein the deriving one or more phase errors comprises:
- finding an angle corresponding to a respective smoothed error phasor location; and
- interpolating between angles to obtain angles corresponding to second corrected samples for which error phasors were not obtained.

33. The storage device of claim 32, wherein correcting the second corrected samples comprises applying complex phasors with negative values of the respective angles to the corresponding second corrected samples.

* * * * *